United States Patent
Lee et al.

(10) Patent No.: US 10,447,908 B2
(45) Date of Patent: Oct. 15, 2019

(54) ELECTRONIC DEVICE SHOOTING IMAGE

(71) Applicant: Samsung Electronics Co., Ltd., Suwon-si, Gyeonggi-do (KR)

(72) Inventors: Jin Won Lee, Seongnam-si (KR); Jung Ho Park, Suwon-si (KR); Chong Sam Chung, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 54 days.

(21) Appl. No.: 15/785,868

(22) Filed: Oct. 17, 2017

(65) Prior Publication Data

US 2018/0109710 A1   Apr. 19, 2018

(30) Foreign Application Priority Data

Oct. 18, 2016 (KR) .......... 10-2016-0135231

(51) Int. Cl.
*H04N 5/225* (2006.01)
*H04N 5/232* (2006.01)
*H04N 13/239* (2018.01)

(52) U.S. Cl.
CPC ......... *H04N 5/2258* (2013.01); *H04N 5/2254* (2013.01); *H04N 5/23238* (2013.01); *H04N 5/23258* (2013.01); *H04N 5/23287* (2013.01); *H04N 5/23296* (2013.01); *H04N 13/239* (2018.05)

(58) Field of Classification Search
CPC ............... H04N 5/2258; H04N 13/239; H04N 5/23296; H04N 5/23287; H04N 5/2254; H04N 5/23258
See application file for complete search history.

(56) References Cited

U.S. PATENT DOCUMENTS

| 5,436,660 | A | 7/1995 | Sakamoto | |
|---|---|---|---|---|
| 7,724,300 | B2 * | 5/2010 | Misawa | H04N 5/2253 348/333.05 |
| 7,944,498 | B2 * | 5/2011 | Sung | G02B 7/38 348/252 |
| 7,965,314 | B1 * | 6/2011 | Miller | G08B 13/19643 250/330 |

(Continued)

FOREIGN PATENT DOCUMENTS

| EP | 0 503 962 A2 | 9/1992 |
|---|---|---|
| JP | 2001-298656 A | 10/2001 |

(Continued)

OTHER PUBLICATIONS

European Office Action dated Apr. 26, 2019, issued in European Patent Application No. 17197002.3.

*Primary Examiner* — Shahbaz Nazrul
(74) *Attorney, Agent, or Firm* — Jefferson IP Law, LLP

(57) ABSTRACT

An electronic device includes a first camera for shooting in a first direction, a second camera for shooting in the first direction, and at least one processor for processing images collected through the first camera and the second camera. A specified spacing distance is maintained between the first camera and the second camera. Within a shortest focusable distance of the first camera, a first capture area of the first camera is included in a second capture area of the second camera or makes contact with an inside of the second capture area of the second camera.

20 Claims, 11 Drawing Sheets

(56) References Cited

U.S. PATENT DOCUMENTS

| | | | | |
|---|---|---|---|---|
| 8,660,420 B2* | 2/2014 | Chang | ............... | G03B 35/08 |
| | | | | 396/326 |
| 9,438,792 B2* | 9/2016 | Nakada | ............... | H04N 5/23229 |
| 2007/0035631 A1 | 2/2007 | Ueda | | |
| 2011/0063446 A1 | 3/2011 | McMordie et al. | | |
| 2013/0064531 A1* | 3/2013 | Pillman | ............... | H04N 5/23296 |
| | | | | 396/62 |
| 2013/0182150 A1* | 7/2013 | Asakura | ............... | H04N 5/262 |
| | | | | 348/240.3 |
| 2015/0145950 A1* | 5/2015 | Murphy | ............... | H04N 5/23238 |
| | | | | 348/36 |
| 2015/0334309 A1* | 11/2015 | Peng | ............... | H04N 13/271 |
| | | | | 348/47 |
| 2016/0007008 A1* | 1/2016 | Molgaard | ............... | H04N 5/23212 |
| | | | | 348/47 |
| 2016/0112637 A1* | 4/2016 | Laroia | ............... | H04N 5/2257 |
| | | | | 348/221.1 |
| 2016/0150142 A1* | 5/2016 | Lapstun | ............... | B64D 47/08 |
| | | | | 348/36 |
| 2016/0173757 A1* | 6/2016 | Choi | ............... | H04N 5/23212 |
| | | | | 348/262 |
| 2016/0212358 A1* | 7/2016 | Shikata | ............... | H04N 1/2112 |
| 2016/0241793 A1* | 8/2016 | Ravirala | ............... | H04N 5/247 |
| 2017/0085764 A1* | 3/2017 | Kim | ............... | H04N 5/2258 |
| 2017/0366749 A1* | 12/2017 | Zolotov | ............... | H04N 5/2226 |
| 2018/0024329 A1* | 1/2018 | Goldenberg | ............... | G02B 13/16 |
| | | | | 359/557 |
| 2018/0217475 A1* | 8/2018 | Goldenberg | ............... | G03B 3/10 |
| 2018/0288310 A1* | 10/2018 | Goldenberg | ............... | H04N 5/23212 |

FOREIGN PATENT DOCUMENTS

| | | |
|---|---|---|
| KR | 10-2015-0090775 A | 8/2015 |
| KR | 10-2015-0107506 A | 9/2015 |
| WO | 2014-160819 A1 | 10/2014 |

* cited by examiner

ELECTRONIC DEVICE SHOOTING IMAGE

CROSS-REFERENCE TO RELATED APPLICATION(S)

This application claims the benefit under 35 U.S.C. § 119(a) of a Korean patent application filed on Oct. 18, 2016 in the Korean Intellectual Property Office and assigned Serial number 10-2016-0135231, the entire disclosure of which is hereby incorporated by reference.

TECHNICAL FIELD

The present disclosure relates to an electronic device which is equipped with a multi-camera and which is capable of shooting an external object.

BACKGROUND

An electronic device such as a smartphone, a tablet personal computer (PC), or the like may include a camera module. The camera module may collect image data through a lens. The collected image data may be stored in a memory of the electronic device or may be output through a display thereof.

Nowadays, an electronic device equipped with a dual camera is being released. A dual camera may collect the image data through two cameras disposed to be spaced apart from each other by a specific distance. The cameras may capture objects at different angles. The electronic device equipped with the dual camera may generate an image (e.g., an image of high quality, an image of a wide angle of view, a stereoscopic picture, and the like) having a characteristic, which is different from a characteristic of an image captured by a single camera, by composing the images captured at the different angles.

The above information is presented as background information only to assist with an understanding of the present disclosure. No determination has been made, and no assertion is made, as to whether any of the above might be applicable as prior art with regard to the present disclosure.

SUMMARY

In the case where an electronic device according to the related art equipped with both a wide-angle camera and a telephoto camera captures an image, it is difficult to match fields of view (FOVs) of the cameras due to a distance difference between the cameras and a difference between angles of view of the cameras.

In addition, since the FOV of the telephoto camera is not included in the FOV of the wide-angle camera at a point where an object is positioned, it is difficult for the electronic device according to the related art to obtain composed image that a user desires.

Aspects of the present disclosure are to address at least the above-mentioned problems and/or disadvantages and to provide at least the advantages described below. Accordingly, an aspect of the present disclosure is to provide an electronic device which is equipped with a multi-camera and which is capable of shooting an external object.

In accordance with an aspect of the present disclosure, an electronic device is provided. The electronic device includes a first camera for shooting in a first direction, a second camera for shooting in the first direction, and at least one processor for processing images collected through the first camera and the second camera. A specified spacing distance is maintained between the first camera and the second camera. Within a shortest focusable distance of the first camera, a first capture area of the first camera is included in a second capture area of the second camera or makes contact with an inside of the second capture area of the second camera.

In accordance with another aspect of the present disclosure, an electronic device may maintain a state where FOVs of a plurality of camera modules overlap in a region of interest (ROI) in which an object is disposed.

In accordance with another aspect of the present disclosure, the electronic device may actively change the FOV of the camera by moving or rotating a reflecting part (e.g., a mirror, a prism, or the like). As such, the electronic device may match the centers of a plurality of cameras, and may maintain a state suitable to generate an image obtained by composing images collected from the plurality of camera modules.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
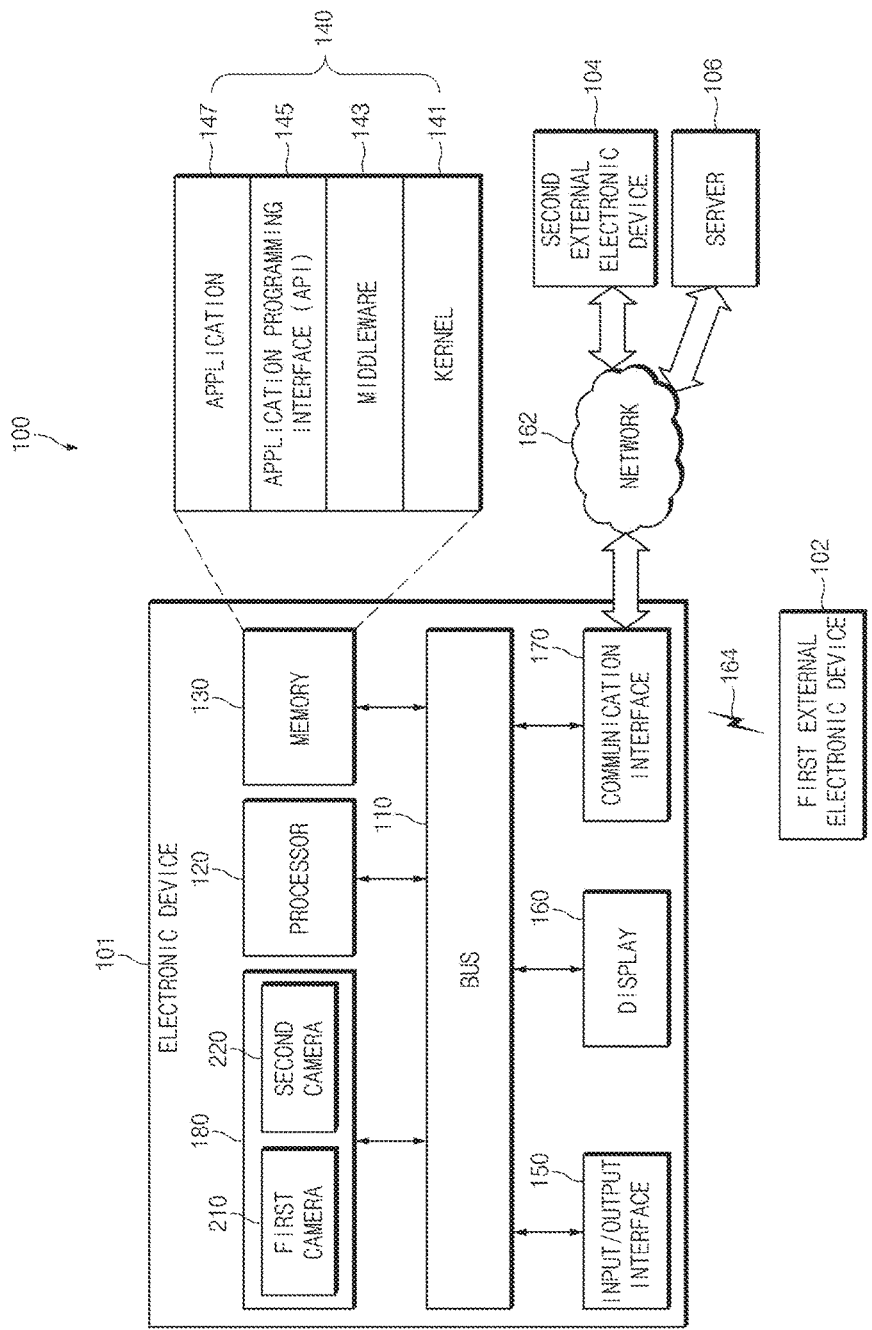
FIG. 1 illustrates an electronic device in a network environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following disclosure, the expressions "have," "may have," "include" and "comprise," or "may include" and "may comprise" used herein indicate existence of corresponding features (for example, elements such as numeric values, functions, operations, or components) but do not exclude presence of additional features.

In the following disclosure, the expressions "A or B," "at least one of A or/and B," or "one or more of A or/and B," and the like used herein may include any and all combinations of one or more of the associated listed items. For example, the term "A or B," "at least one of A and B," or "at least one of A or B" may refer to all of the case (1) where at least one A is included, the case (2) where at least one B is included, or the case (3) where both of at least one A and at least one B are included.

The terms, such as "first," "second," and the like used herein may refer to various elements of various embodiments of the present disclosure, but do not limit the elements. For example, such terms are used only to distinguish an element from another element and do not limit the order and/or priority of the elements. For example, a first user device and a second user device may represent different user devices irrespective of sequence or importance. For example, without departing from the scope of the present disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to the other element or an intervening element (for example, a third element) may be present. In contrast, when an element (for example, a first element) is referred to as being "directly coupled with/to" or "directly connected to" another element (for example, a second element), it should be understood that there are no intervening element (for example, a third element).

According to the situation, the expression "configured to" used herein may be used as, for example, the expression "suitable for," "having the capacity to," "designed to," "adapted to," "made to," or "capable of." The term "configured to (or set to)" must not mean only "specifically designed to" in hardware. Instead, the expression "a device configured to" may mean that the device is "capable of" operating together with another device or other components. Central processing unit (CPU), for example, a "processor configured to (or set to) perform A, B, and C" may mean a dedicated processor (for example, an embedded processor) for performing a corresponding operation or a generic-purpose processor (for example, a CPU or an application processor (AP)) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Moving Picture Experts Group phase 1 or phase 2 (MPEG-1 or MPEG-2) audio layer 3 (MP3) players, mobile medical devices, cameras, and wearable devices. According to various embodiments of the present disclosure, the wearable devices may include accessories (for example, watches, rings, bracelets, ankle bracelets, glasses, contact lenses, or head-mounted devices (HMDs)), cloth-integrated types (for example, electronic clothes), body-attached types (for example, skin pads or tattoos), or implantable types (for example, implantable circuits).

In some embodiments of the present disclosure, the electronic device may be one of home appliances. The home appliances may include, for example, at least one of a digital versatile disc (DVD) player, an audio, a refrigerator, an air conditioner, a cleaner, an oven, a microwave oven, a washing machine, an air cleaner, a set-top box, a home automation control panel, a security control panel, a television (TV) box (for example, Samsung HomeSync™, Apple TV™, or Google TV™), a game console (for example, Xbox™ or PlayStation™), an electronic dictionary, an electronic key, a camcorder, or an electronic panel.

In another embodiment of the present disclosure, the electronic device may include at least one of various medical devices (for example, various portable medical measurement devices (a blood glucose meter, a heart rate measuring device, a blood pressure measuring device, and a body temperature measuring device), a magnetic resonance angiography (MRA), a magnetic resonance imaging (MRI) device, a computed tomography (CT) device, a photographing device, and an ultrasonic device), a navigation system, a global navigation satellite system (GNSS), an event data recorder (EDR), a flight data recorder (FDR), a vehicular infotainment device, electronic devices for vessels (for example, a navigation device for vessels and a gyro compass), avionics, a security device, a vehicular head unit, an industrial or home robot, an automatic teller's machine (ATM) of a financial company, a point of sales (POS) of a store, or an internet of things (for example, a bulb, various sensors, an electricity or gas meter, a spring cooler device, a fire alarm device, a thermostat, an electric pole, a toaster, a sporting apparatus, a hot water tank, a heater, and a boiler).

According to some embodiments of the present disclosure, the electronic device may include at least one of a furniture or a part of a building/structure, an electronic board, an electronic signature receiving device, a projector, or various measurement devices (for example, a water service, electricity, gas, or electric wave measuring device). In various embodiments of the present disclosure, the electronic device may be one or a combination of the aforementioned devices. The electronic device according to some embodiments of the present disclosure may be a flexible electronic device. Further, the electronic device according to an embodiment of the present disclosure is not limited to the aforementioned devices, but may include new electronic devices produced due to the development of technologies.

Hereinafter, electronic devices according to an embodiment of the present disclosure will be described with reference to the accompanying drawings. The term "user" used herein may refer to a person who uses an electronic device or may refer to a device (for example, an artificial electronic device) that uses an electronic device.

FIG. 1 illustrates an electronic device in a network environment according to various embodiments of the present disclosure.

Referring to FIG. 1, there is illustrated an electronic device 101 in a network environment 100 according to various embodiments of the present disclosure.

The electronic device 101 may include a bus 110, a processor 120, a memory 130, an input/output interface 150, a display 160, and a communication interface 170. In various embodiments of the present disclosure, at least one of the foregoing elements may be omitted or another element may be added to the electronic device 101.

The bus 110 may include a circuit for connecting the above-mentioned elements 110 to 170 to each other and transferring communications (e.g., control messages and/or data) among the above-mentioned elements.

The processor 120 may include at least one of a CPU, an AP, or a communication processor (CP). The processor 120 may perform data processing or an operation related to communication and/or control of at least one of the other elements of the electronic device 101.

According to various embodiments, a processor 120 may operate as an image processing unit that processes image data collected through a first camera 210 and a second camera 220. For example, the processor 120 may compose and correct the image data collected through each of the first camera 210 and the second camera 220.

According to various embodiments, the processor 120 may generate a control signal for moving or rotating a reflecting part (or a driving unit mounted in the reflecting part) inside the first camera 210. The processor 120 may allow the field of view (FOV) of the first camera 210 at a point where an object is disposed to be included in the FOV of the second camera 220 or to make contact with the FOV of the second camera 220, by moving or rotating the reflecting part. Additional information about the movement or rotation of the reflecting part (or a driving unit mounted in the reflecting part) of the processor 120 may be provided through FIGS. 3 to 9.

The memory 130 may include a volatile memory and/or a nonvolatile memory. The memory 130 may store instructions or data related to at least one of the other elements of the electronic device 101. According to an embodiment of the present disclosure, the memory 130 may store software and/or a program 140. The program 140 may include, for example, a kernel 141, a middleware 143, an application programming interface (API) 145, and/or an application program (or an application) 147. At least a portion of the kernel 141, the middleware 143, or the API 145 may be referred to as an operating system (OS).

The kernel 141 may control or manage system resources (e.g., the bus 110, the processor 120, the memory 130, or the like) used to perform operations or functions of other programs (e.g., the middleware 143, the API 145, or the application program 147). Furthermore, the kernel 141 may provide an interface for allowing the middleware 143, the API 145, or the application program 147 to access individual elements of the electronic device 101 in order to control or manage the system resources.

The middleware 143 may serve as an intermediary so that the API 145 or the application program 147 communicates and exchanges data with the kernel 141.

Furthermore, the middleware 143 may handle one or more task requests received from the application program 147 according to a priority order. For example, the middleware 143 may assign at least one application program 147 a priority for using the system resources (e.g., the bus 110, the processor 120, the memory 130, or the like) of the electronic device 101. For example, the middleware 143 may handle the one or more task requests according to the priority assigned to the at least one application, thereby performing scheduling or load balancing with respect to the one or more task requests.

The API 145, which is an interface for allowing the application 147 to control a function provided by the kernel 141 or the middleware 143, may include, for example, at least one interface or function (e.g., instructions) for file control, window control, image processing, character control, or the like.

The input/output interface 150 may serve to transfer an instruction or data input from a user or another external device to (an)other element(s) of the electronic device 101. Furthermore, the input/output interface 150 may output instructions or data received from (an)other element(s) of the electronic device 101 to the user or another external device.

The display 160 may include, for example, a liquid crystal display (LCD), a light-emitting diode (LED) display, an organic light-emitting diode (OLED) display, a microelectromechanical systems (MEMS) display, or an electronic paper display. The display 160 may present various content (e.g., a text, an image, a video, an icon, a symbol, or the like) to the user. The display 160 may include a touch screen, and may receive a touch, gesture, proximity or hovering input from an electronic pen or a part of a body of the user.

The communication interface 170 may set communications between the electronic device 101 and an external device (e.g., a first external electronic device 102, a second external electronic device 104, or a server 106). For example, the communication interface 170 may be connected to a network 162 via wireless communications or wired communications so as to communicate with the external device (e.g., the second external electronic device 104 or the server 106).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communications 164. The short-range communications may include at least one of Wi-Fi, Bluetooth (BT), near field communication (NFC), magnetic stripe transmission (MST), or GNSS.

The MST may generate pulses according to transmission data and the pulses may generate electromagnetic signals. The electronic device 101 may transmit the electromagnetic signals to a reader device such as a POS device. The POS device may detect the magnetic signals by using a MST reader and restore data by converting the detected electromagnetic signals into electrical signals.

The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used. The wired communications may include at least one of universal serial bus (USB), high definition multimedia interface (HDMI), recommended standard 832 (RS-232), plain old telephone service (POTS), or the like. The network 162 may include at least one of telecommunications networks, for example, a computer network (e.g., local area network (LAN) or wide area network (WAN)), the Internet, or a telephone network.

A camera module 180 may capture a picture or a video. The camera module 180 may include a plurality of cameras (e.g., the first camera 210 and the second camera 220). Hereinafter, the case where the camera module 180 includes the first camera 210 and the second camera 220 will be described. However, embodiments of the present disclosure may not be limited thereto.

The first camera 210 and the second camera 220 may be disposed to face in the same direction and may be disposed to be spaced apart from each other within a specified distance (e.g., 2 cm). For example, the first camera 210 and the second camera 220 may be a rear camera disposed toward the rear surface (a surface opposite to a surface that a display 160 faces) of the electronic device 101.

In various embodiments, a telephoto lens, the FOV of which is relatively narrow and which is suitable to capture an object within a long distance may be mounted in the first camera 210. A wide-angle lens, the FOV of which is relatively broad and which is suitable to capture an object within a short distance may be mounted in the second camera 220. Additional information about the first camera 210 and the second camera 220 will be provided through FIGS. 2A, 2B, and 3 to 9.

The types of the first external electronic device 102 and the second external electronic device 104 may be the same as or different from the type of the electronic device 101. According to an embodiment of the present disclosure, the server 106 may include a group of one or more servers. A portion or all of operations performed in the electronic device 101 may be performed in one or more other electronic devices (e.g., the first electronic device 102, the second external electronic device 104, or the server 106). When the electronic device 101 should perform a certain function or service automatically or in response to a request, the electronic device 101 may request at least a portion of functions related to the function or service from another device (e.g., the first electronic device 102, the second external electronic device 104, or the server 106) instead of or in addition to performing the function or service for itself. The other electronic device (e.g., the first electronic device 102, the second external electronic device 104, or the server 106) may perform the requested function or additional function, and may transfer a result of the performance to the electronic device 101. The electronic device 101 may use a received result itself or additionally process the received result to provide the requested function or service. To this end, for example, a cloud computing technology, a distributed computing technology, or a client-server computing technology may be used.

Figure 2A:
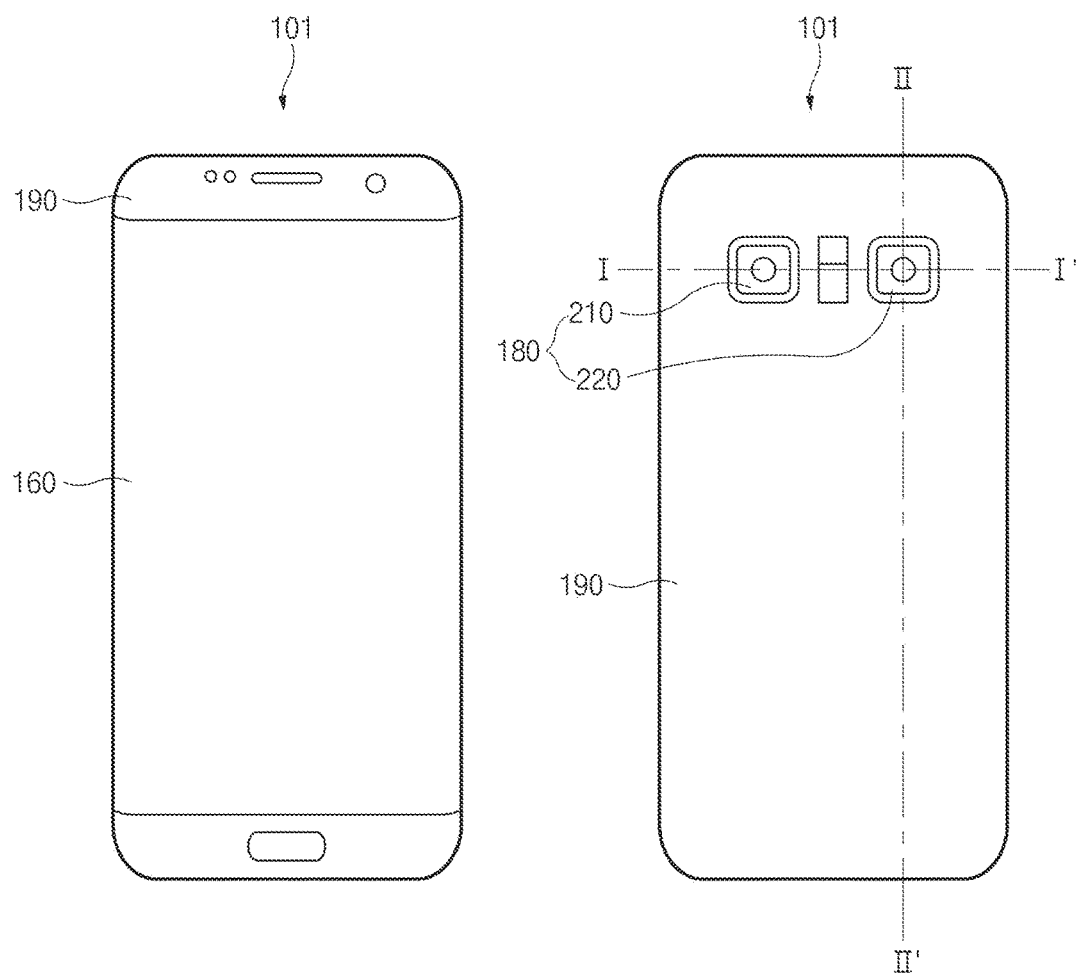
FIG. 2A illustrates an external configuration of an electronic device according to various embodiments of the present disclosure.

FIG. 2A illustrates an external configuration of an electronic device, according to various embodiments of the present disclosure. FIG. 2A is, but is not limited to, only an example.

Referring to FIG. 2A, the electronic device 101 may include the display 160, the camera module 180, and a housing 190 on the outer surface thereof. Additionally, the electronic device 101 may further include a button, a sensor, a microphone, or the like.

The display 160 may output various contents provided to a user and may receive a user input through a touch input. According to various embodiments, the display 160 may output a preview image based on image data collected through the camera module 180. For example, while the user verifies the preview image output through the display 160 in real time after launching a camera app, the user may capture a photo or a video.

A housing 190 may mount the display 160, the camera module 180, a peripheral button, and the like. The housing 190 may mount a processor, a module, a sensor, a circuit board, and the like for driving the electronic device 101 in the inside thereof. In FIG. 1, the camera module 180 is illustrated as being mounted on a rear surface of the housing 190 (a surface opposite to a surface on which the display 160 is disposed). However, embodiments of the present disclosure may not be limited thereto. For example, the camera module 180 may be mounted on the front surface (a surface on which the display 160 is disposed) of the housing 190.

The camera module 180 may include the first camera 210 and the second camera 220. The first camera 210 and the second camera 220 may be disposed to keep a specified distance (e.g., 2 cm). In FIG. 1, the first camera 210 and the second camera 220 are illustrated as being disposed depending on an axis I-I'. However, embodiments of the present disclosure may not be limited thereto. For example, the first camera 210 and the second camera 220 may be disposed depending on an axis II-II' perpendicular to the axis I-I'.

The first camera 210 and the second camera 220 may have different operating characteristics from each other. For example, the first camera 210 may be suitable to capture an object within a long distance because including a telephoto lens. The second camera 220 may be suitable to capture an object within a short distance because including a wide-angle lens.

According to an embodiment, while operating at the same time, the first camera 210 and the second camera 220 may collect pieces of image data, respectively (hereinafter, a dual input mode). In the dual input mode, the first camera 210 may collect first image data, and, at the same time, the second camera 220 may collect second image data. Each of the collected first image data and second image data may be provided to the image processing unit (e.g., a processor or an AP) in the electronic device 101. The image processing unit may synchronize and compose the first image data and the second image data. The image processing unit may generate a preview image output to the display 160 based on the composed image data or may store the composed image in a memory.

Figure 2B:
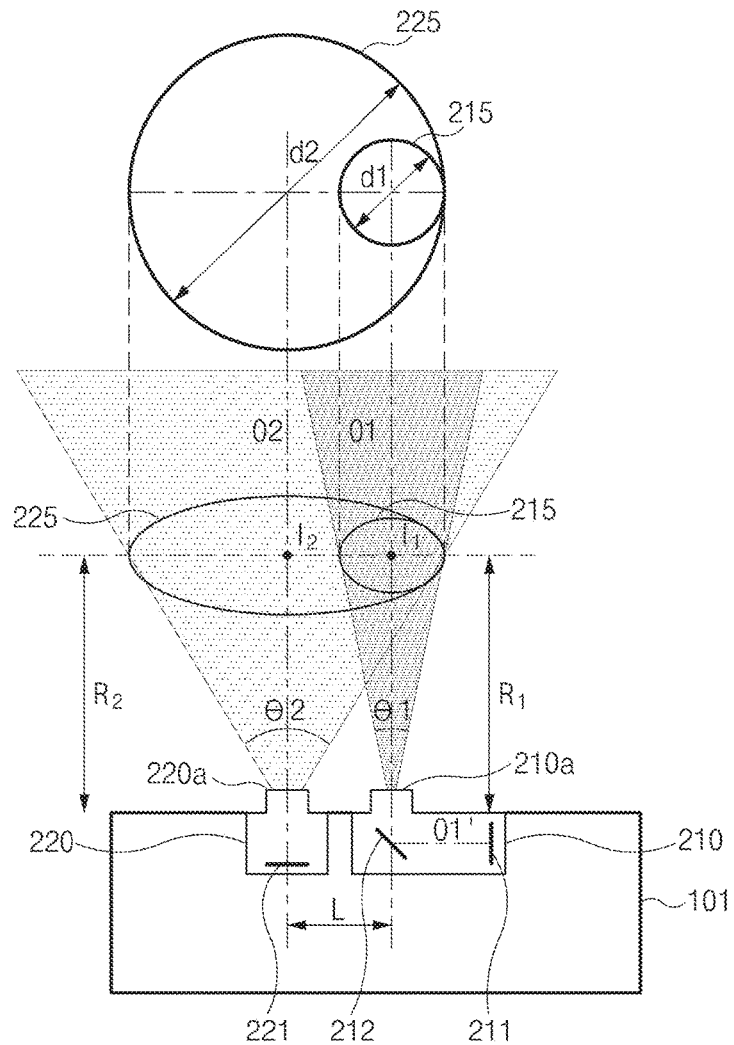
FIG. 2B illustrates placement of a first camera module and a second camera module and a placement relation between fields of view (FOVs) according to various embodiments of the present disclosure.

FIG. 2B illustrates placement of a first camera module and a second camera module and a placement relation between FOVs according to various embodiments of the present disclosure.

Referring to FIG. 2B, the electronic device 101 may include the first camera 210 and the second camera 220. The first camera 210 and the second camera 220 may be disposed such that the centers of lenses are spaced apart from each other by a specified spacing distance L. An opening 210a of the first camera 210 and an opening 220a of the second camera 220 may be disposed to face in the same direction and may collect light. In an embodiment, each of the first camera 210 and the second camera 220 may be in the form of a dual camera disposed on the rear surface (a surface opposite to a surface on which the display 110 is disposed) of the electronic device 101.

The first camera 210 may include an image sensor 211 and a reflecting part 212. The first camera 210 may be implemented with a reflective optical system in which the light passing through the opening 210a is incident on the image sensor 211 after being reflected through the reflecting part 212.

The image sensor 211 may convert the light into electronic image data by using a photoelectric conversion effect. The image sensor 211 may include a group of pixels disposed two-dimensionally, and may convert the light into the electronic image data in each of the pixels. The image sensor 211 may be disposed to face in a direction perpendicular to a surface of the opening 210a though which the light passes. After being reflected by the reflecting part 212, the light collected through the opening 210a may be incident on the image sensor 211.

The reflecting part 212 may reflect the light passing through the opening 210a to the image sensor 211 of the first camera 210. The reflecting part 212 may be in the fixed form that is not adjustable in angle, or may be in the movable or rotatable form by using a separate driving unit (or an actuator) (not illustrated). The reflecting part 212 may be implemented with a mirror, a prism, or the like.

According to various embodiments, the first camera 210 may be a telephoto camera and may have an angle of view θ1 of a specified angle or less. For example, the first camera 210 may have the angle of view of 40° or less.

The first camera 210 may form a first capture area 215 (or a FOV) at an object distance R1. Compared with a second capture area 225 formed by the second camera 220, the first capture area 215 may have a relatively small diameter d1.

The second camera 220 may include a second image sensor 221. Unlike the first camera 210, the second camera 220 may be implemented with a direct optical system not including a separate reflecting part.

The second image sensor 221 may convert the light into electronic image data by using the photoelectric conversion effect. The second image sensor 221 may include a group of pixels disposed two-dimensionally, and may convert the light into the electronic image data in each of the pixels. The second image sensor 221 may be disposed in parallel with the opening 220a through which light passes. The light collected through the opening 220a may be directly incident on the image sensor 221.

The second camera 220 may be a wide-angle camera and may have a relatively wide angle of view θ2. For example, the second camera 220 may have an angle of view of 60°~80°.

The second camera 220 may form the second capture area 225 (or a FOV) at an object distance R2. Compared with the first capture area 215 formed by the first camera 210, the second capture area 225 may have a relatively great diameter d2.

In the embodiment, the object distance R1 may be a shortest focusable distance (or a shortest capturable distance) of the first camera 210. The first capture area 215 of the first camera 210 formed at the shortest focusable distance of the first camera 210 may be included in the second capture area 225 of the second camera 220. In another embodiment, the first capture area 215 formed at the shortest focusable distance of the first camera 210 may make contact with the inside of the second capture area 225.

According to various embodiments, the first camera 210 and the second camera 220 may have a relation of Equation 1 as follows:

$$R2 * \tan\left(\frac{\theta 2}{2}\right) \geq L + R1 * \tan\left(\frac{\theta 1}{2}\right) \qquad \text{Equation 1}$$

R1: the shortest focusable distance of a first camera,
R2: a distance from an object of a second camera,
θ1: angle of view of the first camera,
θ2: angle of view of the second camera, and
L: a spacing distance between the first camera and the second camera.

In an embodiment, a spacing distance L between the first camera 210 and the second camera 220 may be a distance between the center of the opening 210a of the first camera 210 and the center of the opening 220a of the second camera 220. In another embodiment, in a state where an optical axis O1 of light incident on the first camera 210 is in parallel with an optical axis O2 of light incident on the second camera 220, the spacing distance L between the first camera and the second camera may be a distance between the optical axes. In another embodiment, the spacing distance L between the first camera and the second camera may be a distance between the center of the reflecting part 212 in the first camera 210 and the center of the second image sensor 221 in the second camera 220.

Although not illustrated in FIG. 2B, each of the first camera 210 and the second camera 220 may further include a lens part. Additional information about the internal configuration of the first camera 210 and the second camera 220 will be provided through FIG. 4.

Figure 3:
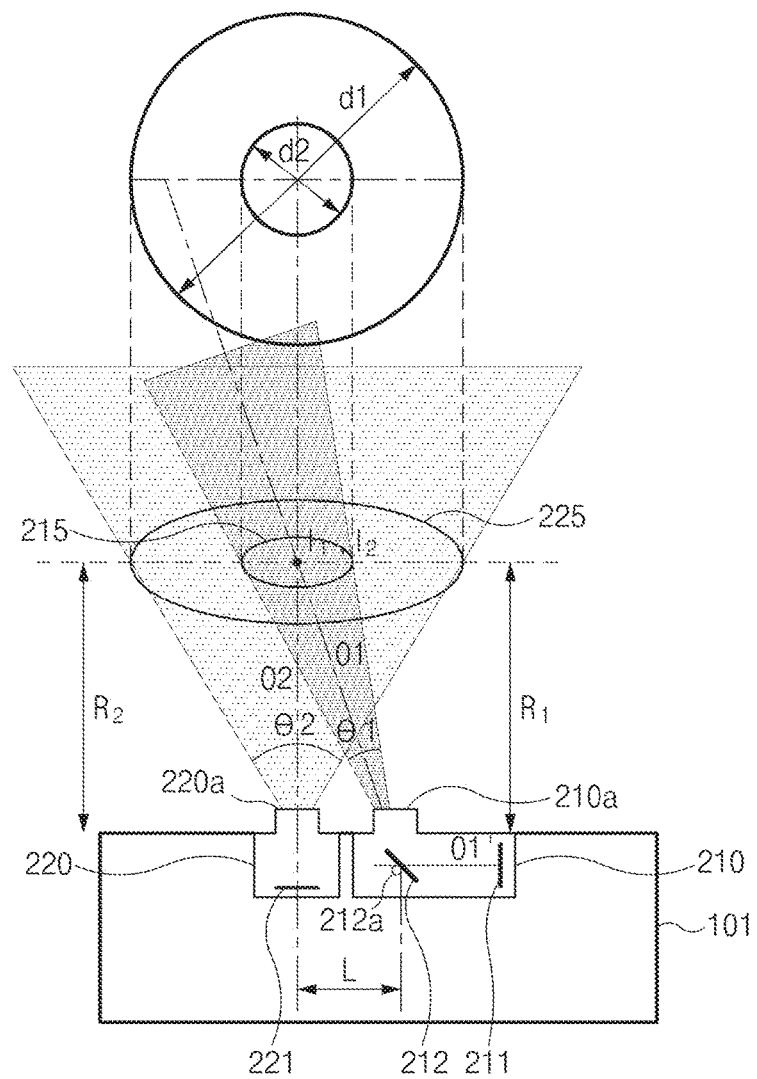
FIG. 3 illustrates movement of a first capture area in a second capture area according to various embodiments of the present disclosure.

FIG. 3 illustrates movement of a first capture area in a second capture area according to various embodiments of the present disclosure.

Referring to FIG. 3, the first camera 210 may further include a driving unit 212a that moves or rotates the reflecting part 212. The driving unit 212a may generate physical power by using an electrical signal. For example, the driving unit 212a may include a driving coil and a magnetic substance. If a current flows into the driving coil, a magnetic field may be induced, and the magnetic substance fixed to the reflecting part 212 may rotate or move due to the induced magnetic field.

The electronic device 101 (a processor (e.g., the processor 120 of FIG. 1) in the electronic device 101) may control driving of the driving unit 212a such that the optical axis O1 of light incident on the first camera 210 is in a slope state. According to various embodiments, the electronic device 101 (a processor in the electronic device 101) may rotate or move the reflecting part 212 such that a center I1 of the first capture area 215 coincides with a center I2 of the second capture area 225.

In an embodiment, the electronic device 101 (a processor in the electronic device 101) may allow the first capture area 215 to move in the second capture area 225 depending on a user input (e.g., a touch input) for driving of the driving unit 212a of the first camera 210. A user may allow the desired object to be disposed in the first capture area 215.

In another embodiment, the processor 120 may generate a signal for automatically controlling the driving unit 212a to compensate a shake (e.g., motion blur) of the object or a shake (e.g., a hand-shake) of the electronic device 101 itself. For example, in the case where a hand-shake is generated by the user during the shoot, the processor 120 may sense a direction or intensity of the generated hand-shake and may generate a fine tilt of the reflecting part 212 to perform blur correcting (optical image stabilizing).

Figure 4:
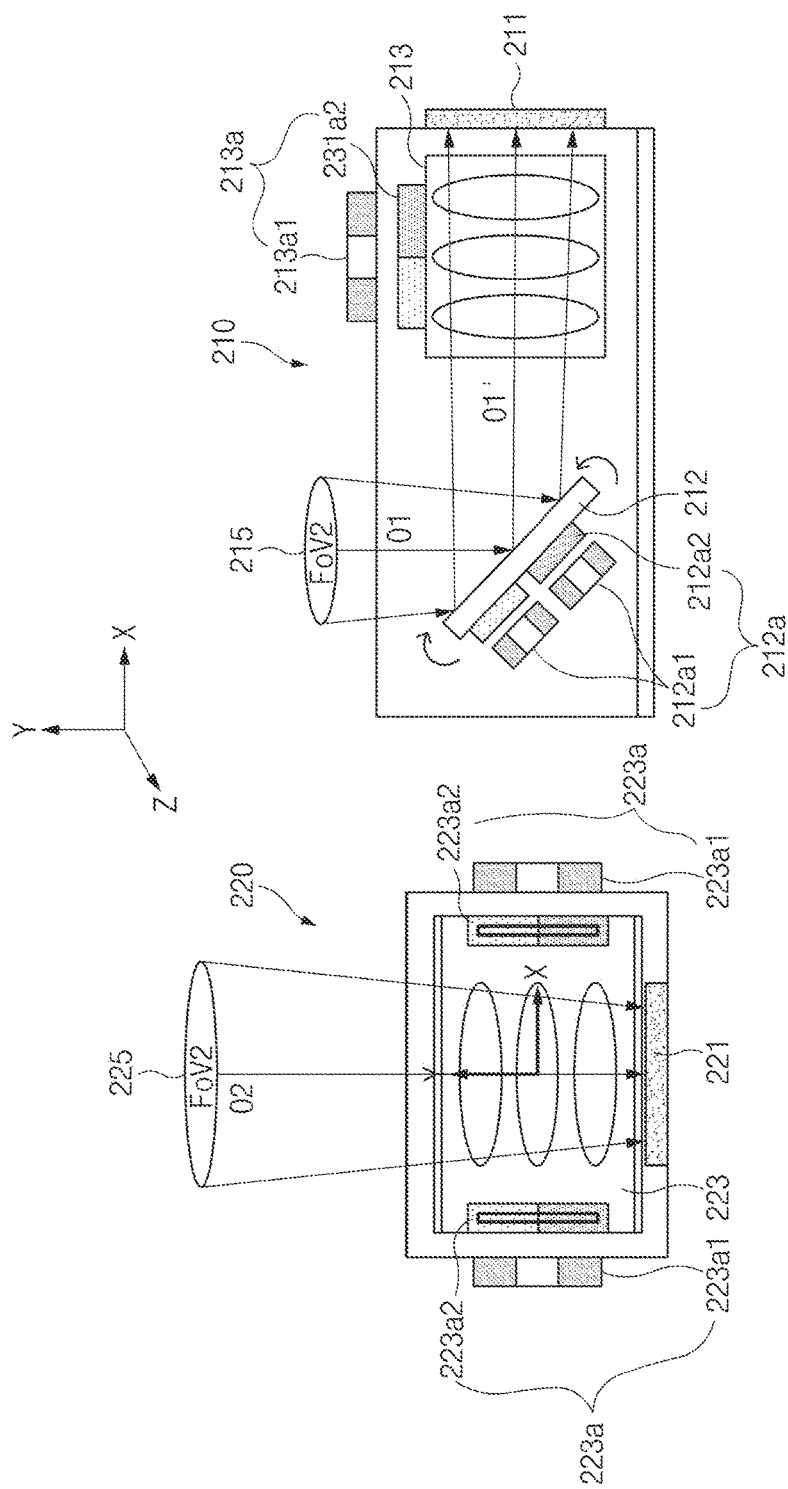
FIG. 4 illustrates internal configurations of a first camera and a second camera according to various embodiments of the present disclosure.

FIG. 4 illustrates internal configurations of a first camera and a second camera according to various embodiments of the present disclosure. FIG. 4 is, but is not limited to, only an example.

Referring to FIG. 4, the first camera 210 may be disposed to be spaced apart from the second camera 220 by a specified spacing distance. The first camera 210 may be implemented to have a reflection-type optical system. In the first camera 210, after being reflected through the reflecting part 212, light incident through the opening 210a may be incident on a lens part 213 and the image sensor 211. After being reflected, the optical axis O1 of light incident to be perpendicular to a surface of the opening 210a may be changed to an optical axis O1' perpendicular to the image sensor 211. The first camera 210 may include the image sensor 211, the reflecting part 212, and the lens part 213.

The image sensor 211 may convert the light into electronic image data by using a photoelectric conversion effect. The image sensor 211 may have a surface perpendicular to the optical axis O1' of the light reflected through the reflecting part 212.

The reflecting part 212 may reflect the light passing through the opening 210a to the image sensor 211 of the first camera 210. After being reflected, the optical axis O1 of the light incident on the reflecting part 212 may be changed to an optical axis O1' perpendicular to the image sensor 211. The reflecting part 212 may be implemented with a mirror, a prism, or the like.

In various embodiments, the reflecting part 212 may rotate or move through the driving unit 212a. The driving unit 212a may include a driving coil 212a1 and a magnetic substance 212a2. If a current flows into the driving coil 212a1, a magnetic field may be induced, and the reflecting part 212 to which the magnetic substance 212a2 is fixed may rotate or move due to the induced magnetic field. In an embodiment, the location of the driving coil 212a1 and the location of the magnetic substance 212a2 may be exchanged with each other. A rotor part and a stator part of the driving unit 212a may be changed.

According to various embodiments, the movement (e.g., motion blur) of an object or a shake (e.g., a hand-shake) of the electronic device 101 itself may be compensated by the movement of the reflecting part 212. For example, in the case where, during the shoot, the object moves or the hand-shake of a user is generated, the processor 120 may offset the hand-shake through a control signal for manipulating the driving unit 212a or may allow a phase to be positioned at the center of an image sensor even though the object moves. Additional information about the movement of the reflecting part 212 will be provided through FIGS. 5 to 9.

The lens part 213 may collect light reflected by the object. The collected light may be imaged on the image sensor 211. According to various embodiments, the lens part 213 may move through a lens driving unit 213a within a specified range. The lens driving unit 213a may include a driving coil 213a1 and a magnetic substance 213a2. If a current flows into the driving coil 213a1, a magnetic field may be induced, and the lens part 213 to which the magnetic substance 213a2 is fixed may move due to the induced magnetic field. By the movement of the lens part 213, the hand-shake of the user may be compensated or the focal distance of the first camera 210 may be adjusted.

The second camera 220 may be disposed to be spaced apart from the first camera 210 by a specified spacing distance. The first camera 220 may be implemented to have a direct-type optical system. In the second camera 220, the light incident through the opening 220a may be incident on a lens part 223 and the second image sensor 221 without reflection. The optical axis O2 of light incident through the opening 220a may be maintained in the form of a straight line. The second camera 220 may include the second image sensor 221 and the lens part 223.

The image sensor 221 may convert the light into electronic image data by using a photoelectric conversion effect. The image sensor 221 may have a surface perpendicular to the optical axis O2 of the light incident through the opening 220a.

The lens part 223 may collect light reflected by the object. The collected light may be imaged on the image sensor 221. According to various embodiments, the lens part 223 may move through a lens driving unit 223a within a specified range. The lens driving unit 223a may include a driving coil 223a1 and a magnetic substance 223a2. If a current flows into the driving coil 223a1, a magnetic field may be induced, and the lens part 223 to which the magnetic substance 223a2 is fixed may move due to the induced magnetic field. By the movement of the lens part 223, the hand-shake of the user may be compensated or the focal distance of the second camera 220 may be adjusted. The location of the driving coil 223a1 and the location of the magnetic substance 223a2 may be exchanged with each other. A rotor part and a stator part of the lens driving unit 223a may be changed.

Figure 5:
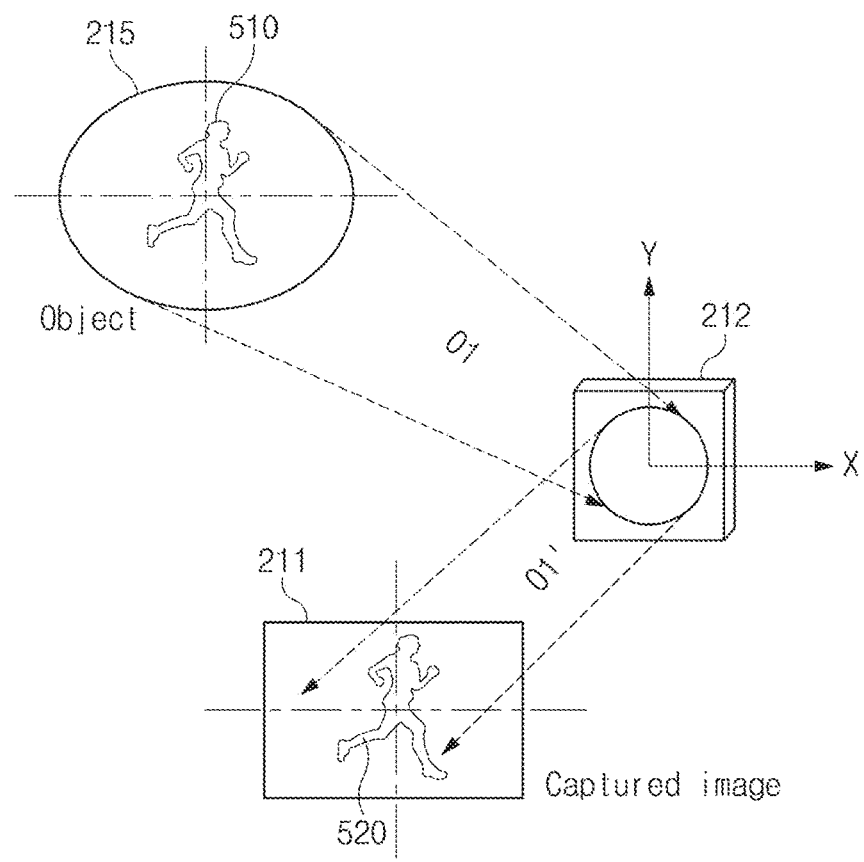
FIG. 5 is a view for describing imaging of an object through a reflecting part by a first camera according to various embodiments of the present disclosure.

FIG. 5 is a view for describing imaging of an object through a reflecting part by a first camera according to various embodiments of the present disclosure. FIG. 5 is, but is not limited to, only an example.

Referring to FIG. 5, the first camera 210 may form the first capture area 215. In the case where a user wants to capture an object 510 of an ROI, the user may allow the first capture area 215 to include the object 510 by adjusting the capture direction (a direction in which the first camera 210 faces) of the electronic device 101. For example, while verifying an image currently captured through the display 160, the user may change the direction of the electronic device 101 such that the object 510 appears on the display 160.

Light generated by the object 510 or light reflected by the object 510 may be incident on the reflecting part 212 in the first camera 210. After being reflected, the optical axis O1 of the light incident on the reflecting part 212 may be changed to an optical axis O1' perpendicular to the image sensor 211.

After reflecting the incident light, the reflecting part 212 may allow the light to be incident on the image sensor 211. In the case where there is no movement of the object 510 or in the case where there is no hand-shake of the user, the reflecting part 212 may be maintained in a fixed state without the separate movement or rotation.

The image sensor 211 may capture an imaged image 520 of the object 510 by the reflected light. After is changed to an electrical signal, the image captured by the image sensor 211 may be transmitted to an image processing unit (or a processor) thereof.

Figure 6:
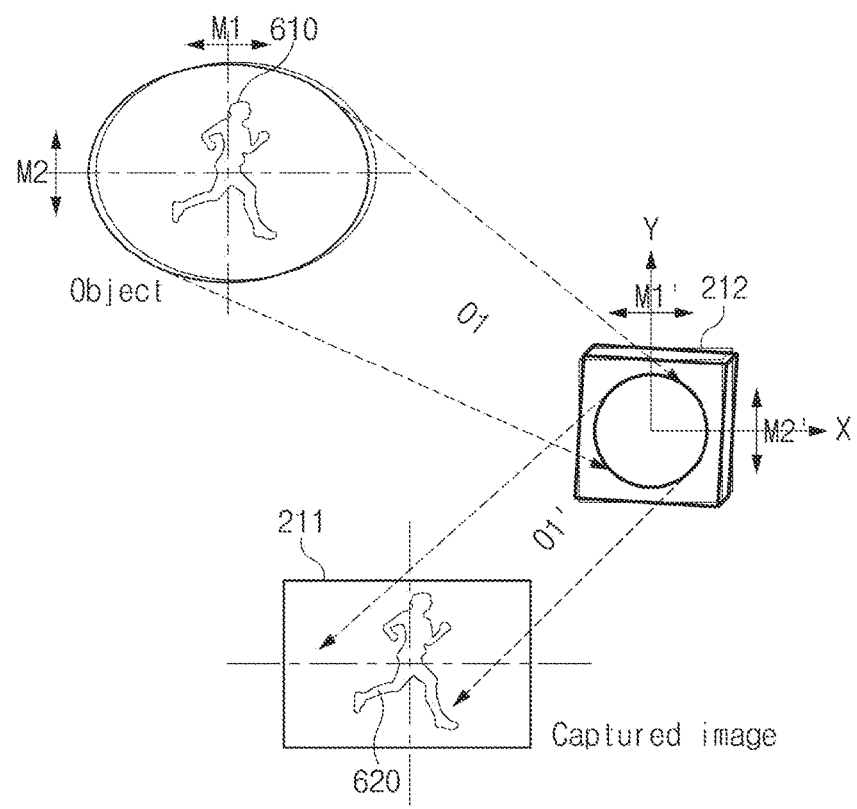
FIG. 6 is a view for describing how a shake of an electronic device is compensated by using a reflecting part according to various embodiments of the present disclosure.

FIG. 6 is a view for describing how a shake of an electronic device is compensated by using a reflecting part according to various embodiments of the present disclosure. However, FIG. 6 is but not limited thereto.

Referring to FIG. 6, the processor 120 may generate a signal for automatically controlling the driving unit 212*a* to compensate a shake (e.g., a hand-shake) of the electronic device 101 itself. In the case where a shake (e.g., a hand-shake) is generated by a user during the shoot, the processor 120 may sense the direction or intensity of the shake by using a sensor module (e.g., a gyro sensor).

For example, in the case where movement of M1 in the X-direction and M2 in the Y-direction is generated by the hand-shake during the shoot of the user, an imaged image 620 may be shaken by the hand-shake even though an object 610 is in a stopped state. The processor 120 may sense the shake of the electronic device 101 itself by using a motion sensor (e.g., a gyro sensor).

To compensate M1 in the X-direction, the processor 120 may generate M1' corresponding to M1 in the reflecting part 212. M1' may be movement of an opposite direction for compensating M1. To compensate M2 in the Y-direction, the processor 120 may generate M2' corresponding to M2 in the reflecting part 212. M2' may be movement of an opposite direction for compensating M2.

The imaged image 620 may be imaged at the center of the image sensor 211 without the shake, by finely tilting the reflecting part 212. In various embodiments, as illustrated in FIG. 2B or 3, the movement range of the capture area 215 due to the fine tilt of the reflecting part 212 may be limited to movement into the capture area 225 of the second camera 220.

Figure 7:
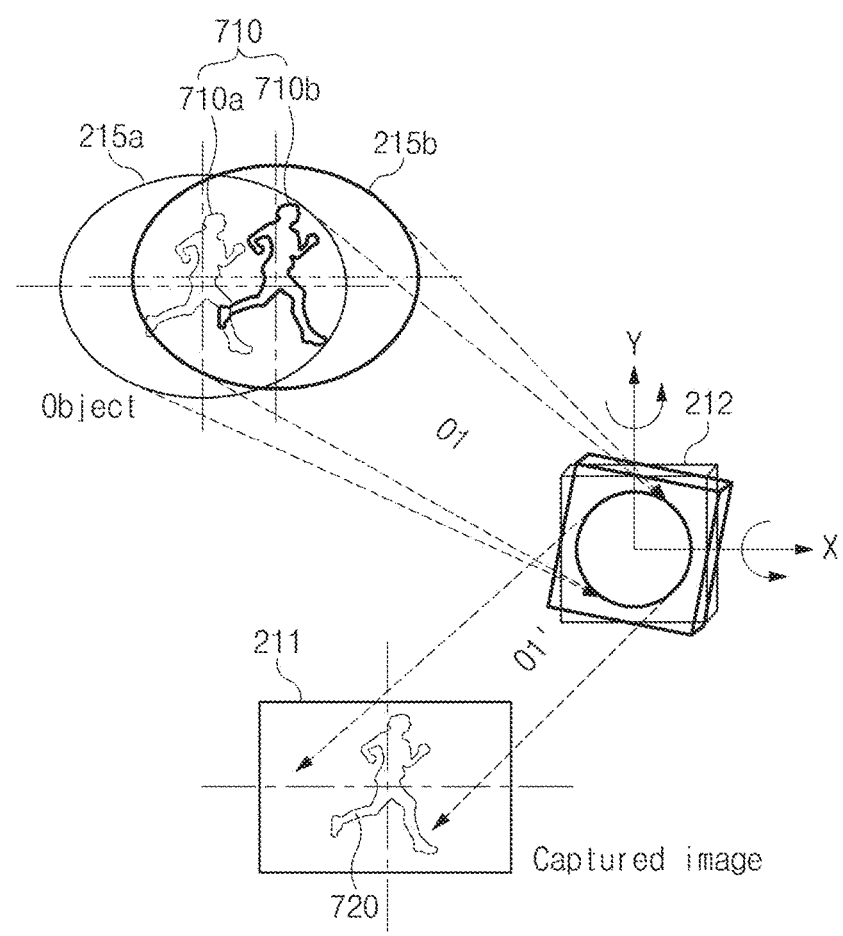
FIG. 7 is a view illustrating how movement of an object is compensated by using a reflecting part according to various embodiments of the present disclosure.

FIG. 7 is a view illustrating how movement of an object is compensated by using a reflecting part according to various embodiments of the present disclosure.

Referring to FIG. 7, the processor 120 may generate a signal for automatically controlling the driving unit 212*a* to compensate movement (e.g., motion blur) of an object 710 during the shoot. In the case where the object 710 during the shoot moves from a first state 710*a* to a second state 710*b*, the processor 120 may sense the direction or size of an object through the comparison between frames and may perform shooting for tracking the object.

For example, the object 710 may be disposed at the center of a capture area 215*a* in the first state 710*a*. In the case where the object 710 is in the second state 710*b* after moving, the object 710 may be positioned in a right-side area of the capture area 215*a*. In the case where there is no separate movement of the reflecting part 212, the imaged image 720 may be imaged in an area that is shifted to the right, not the center of the image sensor 211.

The processor 120 may sense the movement direction or the movement distance of the object 710 by using a sensor module or through the comparison of image frames and may generate a signal for controlling the driving unit 212*a*. The object 710 in the second state 710*b* may be disposed at the center of the capture area 215*b* depending on the movement of the reflecting part 212. In various embodiments, the processor 120 may track the object 710 by using an algorithm such as face detection, detection for extracting minutiae of the object 710 such as auto-focus (AF) lock-in or the like after performing AF on an object of ROI, or the like.

The imaged image 720 may be imaged at the center of the image sensor 211 without the shake by the movement or rotation of the reflecting part 212. In various embodiments, as illustrated in FIG. 2B or 3, the movement range of the capture area 215 due to the movement or rotation of the reflecting part 212 may be limited to movement into the capture area 225 of the second camera 220.

Figure 8:
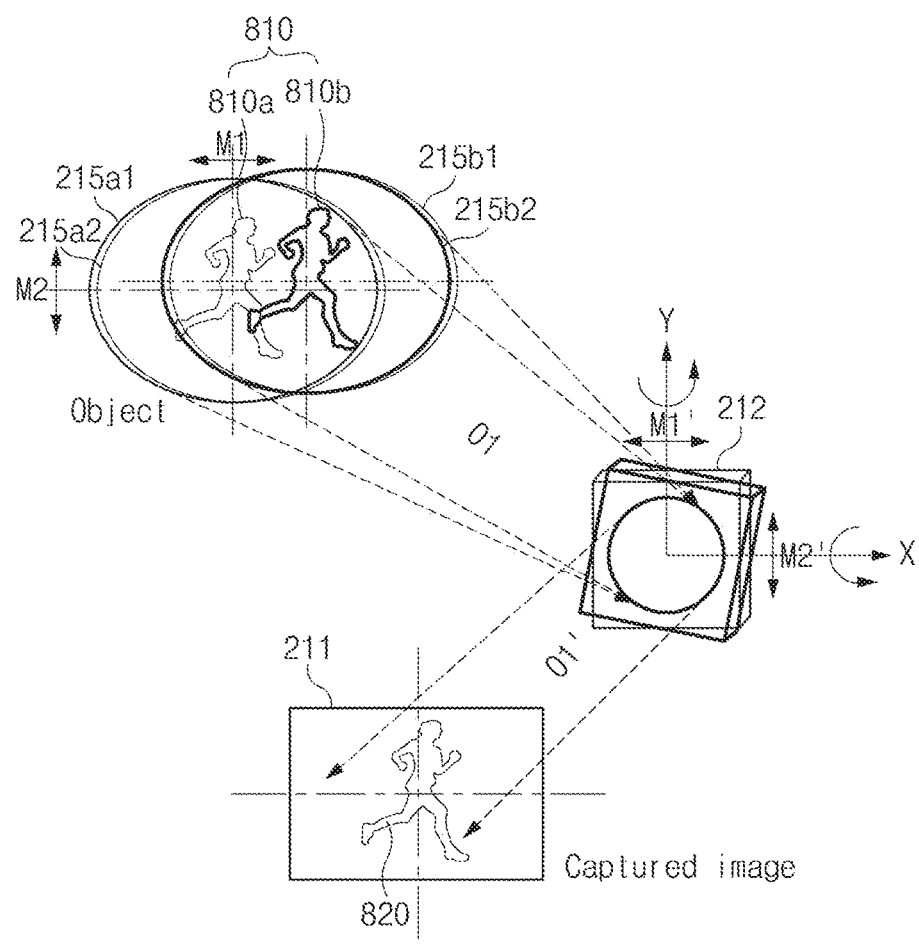
FIG. 8 is a view illustrating how a shake of an electronic device and movement of an object are compensated by using a reflecting part according to various embodiments of the present disclosure.

FIG. 8 is a view illustrating how a shake of an electronic device and movement of an object are compensated by using a reflecting part according to various embodiments of the present disclosure. FIG. 8 is, but is not limited to, only an example.

Referring to FIG. 8, the processor 120 may generate a signal for automatically controlling the driving unit 212*a* to compensate a shake (e.g., a hand-shake) of the electronic device 101 itself and movement (e.g., motion blur or motion tracking) of an object 810.

For example, the object 810 may move from a first state 810*a* to a second state 810*b* during the shoot, and, at the same time, the movement of M1 in the X-direction and M2 in the Y-direction may be generated by the hand-shake of a user. In the first state 810*a*, the object 810 may be disposed at the center of a capture area 215*a*1 or 215*a*2. In a change according to the movement of the object 810, a movement range may be relatively great. The movement range due to the hand-shake of the user may be relatively small.

The processor 120 may detect each of the direction and distance (M1 in the X-direction and M2 in the Y-direction) of the hand-shake and the movement direction and movement distance of the object 810, and may generate a signal for controlling the driving unit 212*a* mounted in the reflecting part 212.

To compensate M1 in the X-direction, the processor 120 may generate M1' corresponding to M1 in the reflecting part 212. M1' may be movement of an opposite direction for compensating M1. At the same time, the processor 120 may allow the object 810 in the second state 810*b* to be disposed at the center of the capture area 215*b*1 or 215*b*2 depending on the movement of the reflecting part 212. The imaged image 820 may be imaged at the center of the image sensor 211 without the shake or movement by the movement or rotation of the reflecting part 212.

Figure 9:
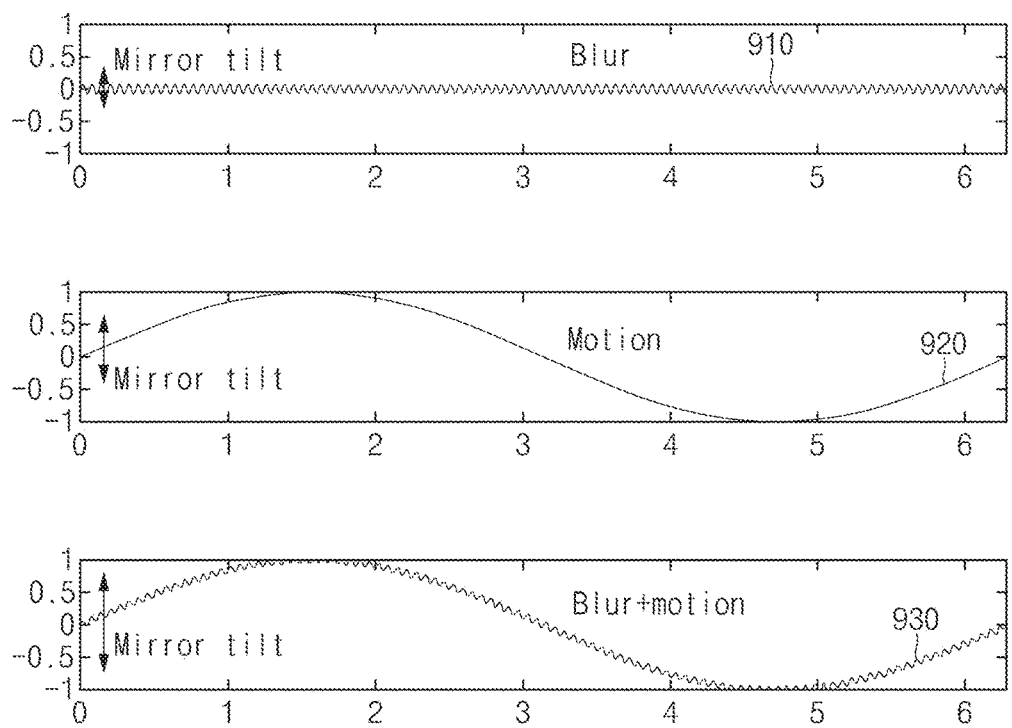
FIG. 9 illustrates a waveform according to a shake of an electronic device and movement of an object according to various embodiments of the present disclosure.

FIG. 9 illustrates a waveform of movement according to a shake of an electronic device and movement of an object according to various embodiments of the present disclosure. FIG. 9 is, but is not limited to, only an example.

Referring to FIG. 9, a waveform 910 of the shake (e.g., a hand-shake) of the electronic device 101 may have a relatively small size and may have a high-frequency characteristic. The processor 120 may reflect the characteristic of the waveform 910 of the shake to control the driving unit 212*a* of the reflecting part 212 (e.g., in the case of FIG. 6).

A waveform 920 according to the movement of an object may have a relatively great size and may have a low-frequency characteristic. The processor 120 may reflect the characteristic of the waveform 920 according to the movement of the object to control the driving unit 212*a* of the reflecting part 212 (e.g., in the case of FIG. 7).

A waveform 930 generated by both the shake (e.g., a hand-shake) of the electronic device 101 and the movement of the object may be in the form in which the waveform 910 and the waveform 920 are combined. The processor 120 may reflect the characteristic of the waveform 930 of the shake to control the driving unit 212a of the reflecting part 212. The processor 120 may apply a fine drive for compensating the shake (e.g., a hand-shake) of the electronic device 101 and a drive having a relatively greater range for compensating the location movement of the capture area 215 to the driving unit 212a (e.g., in the case of FIG. 8).

Figure 10:
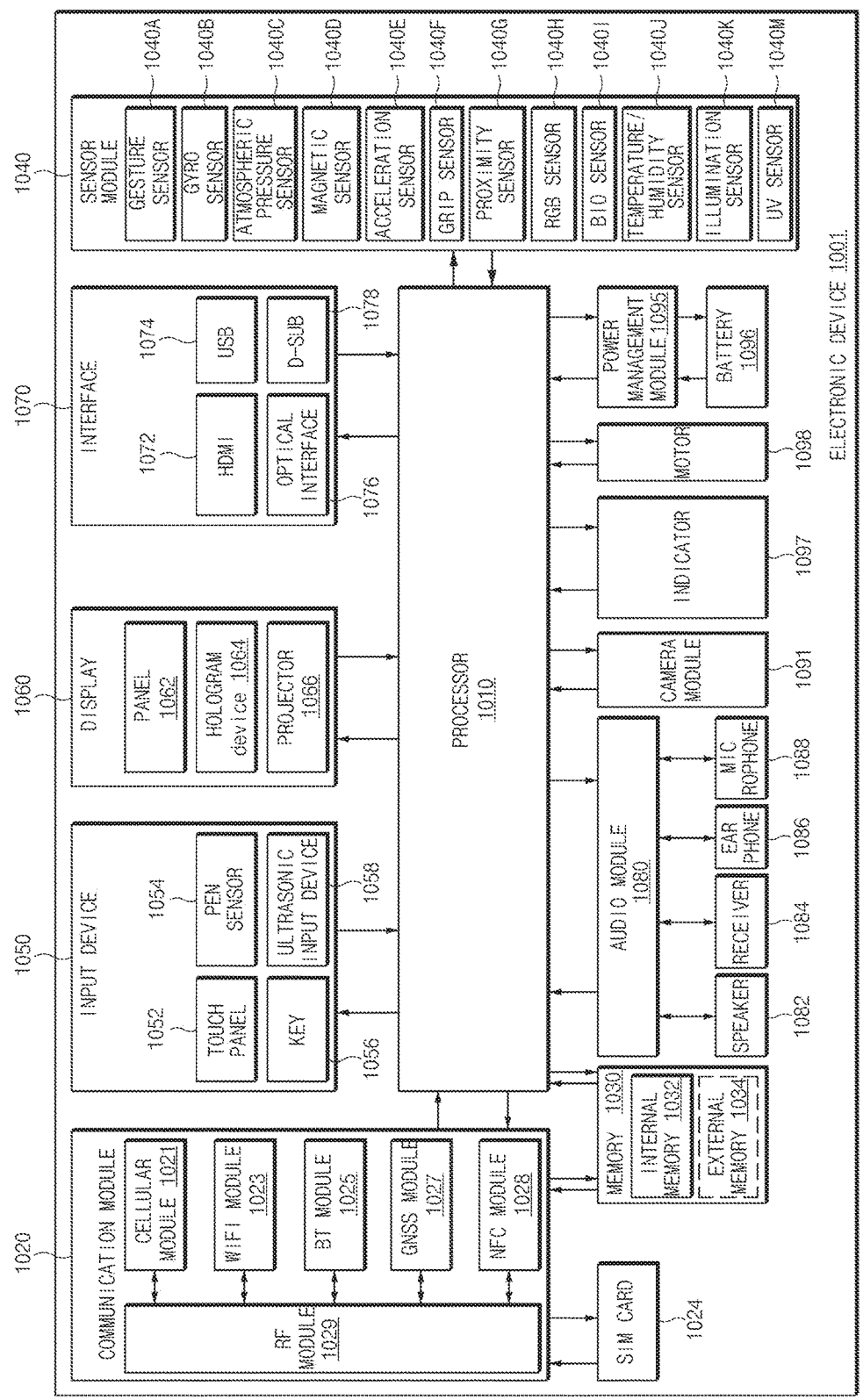
FIG. 10 illustrates a block diagram of the electronic device according to various embodiments of the present disclosure.

FIG. 10 is a block diagram illustrating an electronic device according to an embodiment of the present disclosure.

Referring to FIG. 10, an electronic device 1001 may include, for example, a part or the entirety of the electronic device 101 illustrated in FIG. 1. The electronic device 1001 may include at least one processor (e.g., AP) 1010, a communication module 1020, a subscriber identification module (SIM) 1024, a memory 1030, a sensor module 1040, an input device 1050, a display 1060, an interface 1070, an audio module 1080, a camera module 1091, a power management module 1095, a battery 1096, an indicator 1097, and a motor 1098.

The processor 1010 may run an operating system or an application program so as to control a plurality of hardware or software elements connected to the processor 1010, and may process various data and perform operations. The processor 1010 may be implemented with, for example, a system on chip (SoC). According to an embodiment of the present disclosure, the processor 1010 may further include a graphic processing unit (GPU) and/or an image signal processor. The processor 1010 may include at least a portion (e.g., a cellular module 1021) of the elements illustrated in FIG. 10. The processor 1010 may load, on a volatile memory, an instruction or data received from at least one of other elements (e.g., a nonvolatile memory) to process the instruction or data, and may store various data in a nonvolatile memory.

The communication module 1020 may have a configuration that is the same as or similar to that of the communication interface 170 of FIG. 1. The communication module 1020 may include, for example, a cellular module 1021, a Wi-Fi module 1023, a BT module 1025, a GNSS module 1027 (e.g., a GPS module, a GLONASS module, a BeiDou module, or a Galileo module), a NFC module 1028, and a radio frequency (RF) module 1029.

The cellular module 1021 may provide, for example, a voice call service, a video call service, a text message service, or an Internet service through a communication network. The cellular module 1021 may identify and authenticate the electronic device 1001 in the communication network using the subscriber identification module 1024 (e.g., a SIM card). The cellular module 1021 may perform at least a part of functions that may be provided by the processor 1010. The cellular module 1021 may include a CP.

Each of the Wi-Fi module 1023, the Bluetooth module 1025, the GNSS module 1027 and the NFC module 1028 may include, for example, a processor for processing data transmitted/received through the modules. According to some various embodiments of the present disclosure, at least a part (e.g., two or more) of the cellular module 1021, the Wi-Fi module 1023, the Bluetooth module 1025, the GNSS module 1027, and the NFC module 1028 may be included in a single integrated chip (IC) or IC package.

The RF module 1029 may transmit/receive, for example, communication signals (e.g., RF signals). The RF module 1029 may include, for example, a transceiver, a power amp module (PAM), a frequency filter, a low noise amplifier (LNA), an antenna, or the like. According to another embodiment of the present disclosure, at least one of the cellular module 1021, the Wi-Fi module 1023, the Bluetooth module 1025, the GNSS module 1027, or the NFC module 1028 may transmit/receive RF signals through a separate RF module.

The SIM 1024 may include, for example, an embedded SIM and/or a card containing the subscriber identity module, and may include unique identification information (e.g., an integrated circuit card identifier (ICCID)) or subscriber information (e.g., international mobile subscriber identity (IMSI)).

The memory 1030 (e.g., the memory 130) may include, for example, an internal memory 1032 or an external memory 1034. The internal memory 1032 may include at least one of a volatile memory (e.g., a dynamic RAM (DRAM), a static RANI (SRAM), a synchronous dynamic RAM (SDRAM), or the like), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 1034 may include a flash drive such as a compact flash (CF), a secure digital (SD), a Micro-SD, a Mini-SD, an extreme digital (xD), a MultiMediaCard (MMC), a memory stick, or the like. The external memory 1034 may be operatively and/or physically connected to the electronic device 1001 through various interfaces.

The sensor module 1040 may, for example, measure physical quantity or detect an operation state of the electronic device 1001 so as to convert measured or detected information into an electrical signal. The sensor module 1040 may include, for example, at least one of a gesture sensor 1040A, a gyro sensor 1040B, a barometric pressure sensor 1040C, a magnetic sensor 1040D, an acceleration sensor 1040E, a grip sensor 1040F, a proximity sensor 1040G, a color sensor 1040H (e.g., a red/green/blue (RGB) sensor), a biometric sensor 1040I, a temperature/humidity sensor 1040J, an illumination sensor 1040K, or an ultraviolet (UV) sensor 1040M. Additionally or alternatively, the sensor module 1040 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 1040 may further include a control circuit for controlling at least one sensor included therein. In some various embodiments of the present disclosure, the electronic device 1001 may further include a processor configured to control the sensor module 1040 as a part of the processor 1010 or separately, so that the sensor module 1040 is controlled while the processor 1010 is in a sleep state.

The input device 1050 may include, for example, a touch panel 1052, a (digital) pen sensor 1054, a key 1056, or an ultrasonic input device 1058. The touch panel 1052 may employ at least one of capacitive, resistive, infrared, and ultraviolet sensing methods. The touch panel 1052 may further include a control circuit. The touch panel 1052 may further include a tactile layer so as to provide a haptic feedback to a user.

The (digital) pen sensor 1054 may include, for example, a sheet for recognition which is a part of a touch panel or is separate. The key 1056 may include, for example, a physical button, an optical button, or a keypad. The ultrasonic input device 1058 may sense ultrasonic waves generated by an input tool through a microphone 1088 so as to identify data corresponding to the ultrasonic waves sensed.

The display 1060 (e.g., the display 160) may include a panel 1062, a hologram device 1064, or a projector 1066. The panel 1062 may have a configuration that is the same as or similar to that of the display 160 of FIG. 1. The panel 1062 may be, for example, flexible, transparent, or wearable. The panel 1062 and the touch panel 1052 may be integrated into a single module. The hologram device 1064 may display a stereoscopic image in a space using a light interference phenomenon. The projector 1066 may project light onto a screen so as to display an image. The screen may be disposed in the inside or the outside of the electronic device 1001. According to an embodiment of the present disclosure, the display 1060 may further include a control circuit for controlling the panel 1062, the hologram device 1064, or the projector 1066.

The interface 1070 may include, for example, an HDMI 1072, a USB 1074, an optical interface 1076, or a D-subminiature (D-sub) 1078. The interface 1070, for example, may be included in the communication interface 170 illustrated in FIG. 1. Additionally or alternatively, the interface 1070 may include, for example, a mobile high-definition link (MHL) interface, an SD card/multi-media card (MMC) interface, or an infrared data association (IrDA) interface.

The audio module 1080 may convert, for example, a sound into an electrical signal or vice versa. At least a portion of elements of the audio module 1080 may be included in the input/output interface 150 illustrated in FIG. 1. The audio module 1080 may process sound information input or output through a speaker 1082, a receiver 1084, an earphone 1086, or the microphone 1088.

The camera module 1091 is, for example, a device for shooting a still image or a video. According to an embodiment of the present disclosure, the camera module 1091 may include at least one image sensor (e.g., a front sensor or a rear sensor), a lens, an image signal processor (ISP), or a flash (e.g., an LED or a xenon lamp).

The power management module 1095 may manage power of the electronic device 1001. According to an embodiment of the present disclosure, the power management module 1095 may include a power management integrated circuit (PMIC), a charger integrated circuit (IC), or a battery or gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 1096 and a voltage, current or temperature thereof while the battery is charged. The battery 1096 may include, for example, a rechargeable battery and/or a solar battery.

The indicator 1097 may display a specific state of the electronic device 1001 or a part thereof (e.g., the processor 1010), such as a booting state, a message state, a charging state, or the like. The motor 1098 may convert an electrical signal into a mechanical vibration, and may generate a vibration or haptic effect. Although not illustrated, a processing device (e.g., a GPU) for supporting a mobile TV may be included in the electronic device 1001. The processing device for supporting a mobile TV may process media data according to the standards of digital multimedia broadcasting (DMB), digital video broadcasting (DVB), MediaFLO™, or the like.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

According to various embodiments, an electronic device includes a first camera configured to shoot in a first direction, a second camera configured to shoot in the first direction, a processor configured to process images collected through the first camera and the second camera, wherein a spacing distance is maintained between the first camera and the second camera, and wherein, within a shortest focusable distance of the first camera, a first capture area of the first camera is included in a second capture area of the second camera or makes contact with an inside of the second capture area of the second camera.

According to various embodiments, an internal boundary of the second capture area makes contact with an external boundary of the first capture area in a state where an optical axis of light incident on the first camera is in parallel with an optical axis of light incident on the second camera.

According to various embodiments, if an optical axis of light incident on the first camera is in parallel with an optical axis of light incident on the second camera, the spacing distance is a distance between the optical axes.

According to various embodiments, the spacing distance is a distance between a center of a first opening of the first camera, through which light is incident, and a center of a second opening of the second camera, through which light is incident.

According to various embodiments, the spacing distance is a distance between a center of a reflecting part, which reflects light in the first camera, and a center of an image sensor in the second camera.

According to various embodiments, the first camera includes a reflective optical system equipped with a telephoto lens, and the second camera includes a direct optical system equipped with a wide-angle lens.

According to various embodiments, the first camera includes an image sensor configured to convert light into electronic image data, a reflecting part configured to reflect light incident from an outside to the image sensor, and a driving unit configured to move or rotate the reflecting part.

According to various embodiments, the processor controls the driving unit to move or rotate the reflecting part such that a center of the first capture area coincides with a center of the second capture area within a specific subject distance.

According to various embodiments, if an external object moves, the processor controls the driving unit such that at least a part of the object is disposed at a center of the first capture area, thereby rotating the reflecting part.

According to various embodiments, the processor senses a movement direction or a movement distance of the object to control the driving unit.

According to various embodiments, if a shake is generated by the electronic device, the processor controls the driving unit to move the reflecting part, thereby compensating the shake.

According to various embodiments, the processor reflects a frequency component of the shake to control the driving unit such that movement or vibration of a specified range or less is made in the reflecting part.

According to various embodiments, the processor senses the shake of the electronic device based on sensing information of a gyro sensor mounted in the electronic device.

According to various embodiments, the processor controls the lens driving unit to move or rotate the reflecting part, thereby compensating movement of an external object and a shake of the electronic device.

According to various embodiments, the first camera includes a lens part interposed between the image sensor and the reflecting part, and a lens driving unit configured to drive the lens part.

According to various embodiments, the processor controls the lens driving unit so as to compensate movement of an external object and a shake of the electronic device.

According to various embodiments, the lens driving unit moves a lens part in a direction perpendicular to light reflected by the reflecting part.

According to various embodiments, the first camera and the second camera are disposed to satisfy $$R2*\tan\left(\frac{\theta 2}{2}\right) \geq L + R1*\tan\left(\frac{\theta 1}{2}\right),$$

where R1 denotes the shortest focusable distance of the first camera, R2 denotes a distance from an object of the second camera, θ1 denotes an angle of view of the first camera, θ2 denotes an angle of view of the second camera, and L denotes a spacing distance between the first camera and the second camera.

According to various embodiments, an image shooting method is performed by an electronic device including a first camera and a second camera, and includes shooting in a first direction by using the first camera to collect first image data, shooting in the first direction by using the second camera to collect second image data, and allowing, within a shortest focusable distance of the first camera, a first capture area corresponding to the first image data to be included in a second capture area corresponding to the second image data or to make contact with the second capture area corresponding to the second image data, by rotating or moving a reflecting part included in the first camera.

According to various embodiments, the allowing of the first capture area corresponding to the first image data to make contact with the second capture area includes in a state where an optical axis of light incident on the first camera is in parallel with an optical axis of light incident on the second camera, allowing an internal boundary of the second capture area to make contact with an external boundary of the first capture area, by rotating or moving the reflecting part included in the first camera.

The term "module" used herein may represent, for example, a unit including one of hardware, software and firmware or a combination thereof. The term "module" may be interchangeably used with the terms "unit," "logic," "logical block," "component" and "circuit." The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 120), the processor may perform functions corresponding to the instructions. The computer-readable storage medium may be, for example, the memory 130.

A computer-readable recording medium may include a hard disk, a floppy disk, a magnetic medium (e.g., a magnetic tape), an optical medium (e.g., compact disc read-only memory (CD-ROM), DVD), a magneto-optical medium (e.g., a floptical disk), or a hardware device (e.g., a ROM, a random access memory (RAM), a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a first camera configured to shoot in a first direction and having a shortest focusable distance;
   a second camera configured to shoot in the first direction; and
   a processor configured to process images collected through the first camera and the second camera,
   wherein a spacing distance is maintained between the first camera and the second camera,
   wherein an angle of view of the first camera is narrower than an angle of view of the second camera,
   wherein the shortest focusable distance is a shortest distance at which a lens can focus, and
   wherein, within the shortest focusable distance of the first camera, a first capture area of the first camera is included in a second capture area of the second camera or makes contact with an inside of the second capture area of the second camera.

2. The electronic device of claim 1, wherein an internal boundary of the second capture area makes contact with an external boundary of the first capture area in a state where an optical axis of light incident on the first camera is in parallel with an optical axis of light incident on the second camera.

3. The electronic device of claim 1, wherein, if an optical axis of light incident on the first camera is in parallel with an optical axis of light incident on the second camera, the spacing distance is a distance between the optical axes.

4. The electronic device of claim 1, wherein the spacing distance is a distance between a center of a first opening of the first camera, through which light is incident, and a center of a second opening of the second camera, through which light is incident.

5. The electronic device of claim 1, wherein the spacing distance is a distance between a center of a reflecting part, which reflects light in the first camera, and a center of an image sensor in the second camera.

6. The electronic device of claim 1,
wherein the first camera includes a reflective optical system equipped with a telephoto lens, and
wherein the second camera includes a direct optical system equipped with a wide-angle lens.

7. The electronic device of claim 1, wherein the first camera includes:
an image sensor configured to convert light into electronic image data;
a reflecting part configured to reflect light incident from an outside to the image sensor; and
a driving unit configured to move or rotate the reflecting part.

8. The electronic device of claim 7, wherein the processor is further configured to control the driving unit to move or rotate the reflecting part such that a center of the first capture area coincides with a center of the second capture area within a specific subject distance.

9. The electronic device of claim 7, wherein, if an external object moves, the processor is further configured to rotate the reflecting part such that at least a part of the external object is disposed at a center of the first capture area.

10. The electronic device of claim 9, wherein the processor is further configured to sense a movement direction or a movement distance of the external object and control the driving unit based on the movement direction or the movement distance.

11. The electronic device of claim 7, wherein, if a shake is generated by the electronic device, the processor is further configured to control the driving unit to move the reflecting part, thereby compensating the shake.

12. The electronic device of claim 11, wherein the processor is further configured to reflect a frequency component of the shake to control the driving unit such that movement or vibration of a specified range or less is made in the reflecting part.

13. The electronic device of claim 11, wherein the processor is further configured to sense the shake of the electronic device based on sensing information of a gyro sensor mounted in the electronic device.

14. The electronic device of claim 7, wherein the processor is further configured to control the driving unit to move or rotate the reflecting part, thereby compensating movement of an external object and a shake of the electronic device.

15. The electronic device of claim 7, wherein the first camera includes:
a lens part interposed between the image sensor and the reflecting part; and
a lens driving unit configured to drive the lens part.

16. The electronic device of claim 15, wherein the processor is further configured to control the lens driving unit so as to compensate movement of an external object and a shake of the electronic device.

17. The electronic device of claim 15, wherein the lens driving unit is further configured to move the lens part in a direction perpendicular to light reflected by the reflecting part.

18. The electronic device of claim 1, wherein the first camera and the second camera are disposed to satisfy:

$$R2 * \tan\left(\frac{\theta 2}{2}\right) \geq L + R1 * \tan\left(\frac{\theta 1}{2}\right)$$

where R1 denotes the shortest focusable distance of the first camera, R2 denotes a distance from an object of the second camera, θ1 denotes the angle of view of the first camera, θ2 denotes the angle of view of the second camera, and L denotes the spacing distance between the first camera and the second camera.

19. An image shooting method performed by an electronic device including a first camera having a shortest focusable distance and a second camera, wherein an angle of view of the first camera is narrower than an angle of view of the second camera, the method comprising:
shooting in a first direction by using the first camera to collect first image data;
shooting in the first direction by using the second camera to collect second image data; and
adjusting, within the shortest focusable distance of the first camera, a first capture area corresponding to the first image data to be included in a second capture area corresponding to the second image data or to make contact with the second capture area corresponding to the second image data, by rotating or moving a reflecting part included in the first camera,
wherein the shortest focusable distance is a shortest distance at which a lens can focus.

20. The method of claim 19, wherein the adjusting of the first capture area corresponding to the first image data to make contact with the second capture area comprises:
in a state where an optical axis of light incident on the first camera is in parallel with an optical axis of light incident on the second camera, allowing an internal boundary of the second capture area to make contact with an external boundary of the first capture area, by rotating or moving the reflecting part included in the first camera.

* * * * *